(12) United States Patent
Abotabl et al.

(10) Patent No.: US 12,526,788 B2
(45) Date of Patent: Jan. 13, 2026

(54) COMMUNICATION OF A TRANSPORT BLOCK ACROSS MULTIPLE COMPONENT CARRIERS

(71) Applicant: QUALCOMM Incorporated, San Diego, CA (US)

(72) Inventors: Ahmed Attia Abotabl, San Diego, CA (US); Abdelrahman Mohamed Ahmed Mohamed Ibrahim, San Diego, CA (US); Muhammad Sayed Khairy Abdelghaffar, San Jose, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 277 days.

(21) Appl. No.: 17/446,383

(22) Filed: Aug. 30, 2021

(65) Prior Publication Data

US 2023/0066898 A1     Mar. 2, 2023

(51) Int. Cl.
| | |
|---|---|
| *H04W 72/1263* | (2023.01) |
| *H04L 1/1812* | (2023.01) |
| *H04L 5/00* | (2006.01) |
| *H04L 5/14* | (2006.01) |
| *H04W 72/0446* | (2023.01) |
| *H04W 72/0453* | (2023.01) |

(52) U.S. Cl.
CPC ....... *H04W 72/1263* (2013.01); *H04L 1/1819* (2013.01); *H04L 5/001* (2013.01); *H04L 5/0039* (2013.01); *H04L 5/14* (2013.01); *H04W 72/0446* (2013.01); *H04W 72/0453* (2013.01)

(58) Field of Classification Search
CPC ......... H04W 72/1263; H04W 72/0446; H04W 72/0453; H04L 1/1819; H04L 5/001; H04L 5/0039; H04L 5/14; H04L 1/0003; H04L 1/1893; H04L 5/0017; H04L 5/0042; H04L 5/0044; H04L 1/0009
See application file for complete search history.

(56) References Cited

U.S. PATENT DOCUMENTS

| | | | |
|---|---|---|---|
| 2009/0136034 A1* | 5/2009 | Gaal ................. | H04L 25/03866 380/268 |
| 2013/0242880 A1* | 9/2013 | Miao ..................... | H04L 5/0044 370/328 |
| 2015/0195070 A1* | 7/2015 | Kim ...................... | H04L 5/0048 370/329 |
| 2016/0381572 A1* | 12/2016 | Shahar .................... | H04W 4/80 455/41.2 |
| 2017/0215186 A1* | 7/2017 | Chen ..................... | H04L 5/0048 |
| 2019/0132172 A1* | 5/2019 | Saito ..................... | H04L 5/0094 |
| 2019/0150132 A1* | 5/2019 | Bala ..................... | H04W 72/541 370/329 |
| 2020/0195386 A1* | 6/2020 | Marinier ............... | H04L 5/0091 |
| 2021/0058219 A1* | 2/2021 | Kimura .................... | H04L 5/14 |
| 2021/0144700 A1* | 5/2021 | Lee ....................... | H04L 5/0053 |
| 2021/0377108 A1* | 12/2021 | Cho ..................... | H04L 41/0896 |

(Continued)

*Primary Examiner* — Thinh D Tran
(74) *Attorney, Agent, or Firm* — Harrity & Harrity, LLP

(57) ABSTRACT

Various aspects of the present disclosure generally relate to wireless communication. In some aspects, a wireless device may map a transport block (TB) across multiple component carriers (CCs) associated with at least one slot of time-frequency resources. The wireless device may transmit the TB based at least in part on mapping the TB. Numerous other aspects are described.

30 Claims, 13 Drawing Sheets

(56) References Cited

U.S. PATENT DOCUMENTS

| | | | |
|---|---|---|---|
| 2022/0046704 A1* | 2/2022 | Jiang | H04L 5/0033 |
| 2023/0048526 A1* | 2/2023 | Harada | H04L 1/1822 |
| 2024/0048342 A1* | 2/2024 | Abotabl | H04L 1/1893 |

* cited by examiner

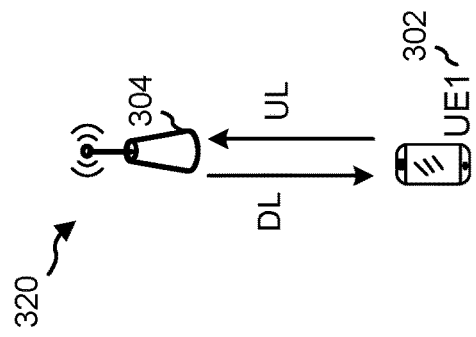
FIG. 3B
FIG. 3C
FIG. 3A

COMMUNICATION OF A TRANSPORT BLOCK ACROSS MULTIPLE COMPONENT CARRIERS

FIELD OF THE DISCLOSURE

Aspects of the present disclosure generally relate to wireless communication and to techniques and apparatuses for communication of a transport block across multiple component carriers.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a wireless device. The method may include mapping a transport block (TB) across multiple component carriers (CCs) associated with at least one slot of time-frequency resources. The method may include transmitting the TB based at least in part on mapping the TB.

Some aspects described herein relate to a method of wireless communication performed by a wireless device. The method may include receiving a TB transmitted across multiple CCs associated with at least one slot of time-frequency resources. The method may include processing the TB based on the TB being mapped across the multiple CCs.

Some aspects described herein relate to a wireless device for wireless communication. The wireless device may include a memory and one or more processors coupled to the memory. The one or more processors may be configured to map a TB across multiple CCs associated with at least one slot of time-frequency resources. The one or more processors may be configured to transmit the TB based at least in part on mapping the TB.

Some aspects described herein relate to a wireless device for wireless communication. The wireless device may include a memory and one or more processors coupled to the memory. The one or more processors may be configured to receive a TB transmitted across multiple CCs associated with at least one slot of time-frequency resources. The one or more processors may be configured to process the TB based on the TB being mapped across the multiple CCs.

Some aspects described herein relate to a non-transitory computer-readable medium that stores a set of instructions for wireless communication by a wireless device. The set of instructions, when executed by one or more processors of the wireless device, may cause the wireless device to map a TB across multiple CCs associated with at least one slot of time-frequency resources. The set of instructions, when executed by one or more processors of the wireless device, may cause the wireless device to transmit the TB based at least in part on mapping the TB.

Some aspects described herein relate to a non-transitory computer-readable medium that stores a set of instructions for wireless communication by a wireless device. The set of instructions, when executed by one or more processors of the wireless device, may cause the wireless device to receive a TB transmitted across multiple CCs associated with at least one slot of time-frequency resources. The set of instructions, when executed by one or more processors of the wireless device, may cause the wireless device to process the TB based on the TB being mapped across the multiple CCs.

Some aspects described herein relate to an apparatus for wireless communication. The apparatus may include means for mapping a TB across multiple CCs associated with at least one slot of time-frequency resources. The apparatus may include means for transmitting the TB based at least in part on mapping the TB.

Some aspects described herein relate to an apparatus for wireless communication. The apparatus may include means for receiving a TB transmitted across multiple CCs associated with at least one slot of time-frequency resources. The apparatus may include means for processing the TB based on the TB being mapped across the multiple CCs.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A-3G are diagrams illustrating examples of full duplex communication, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
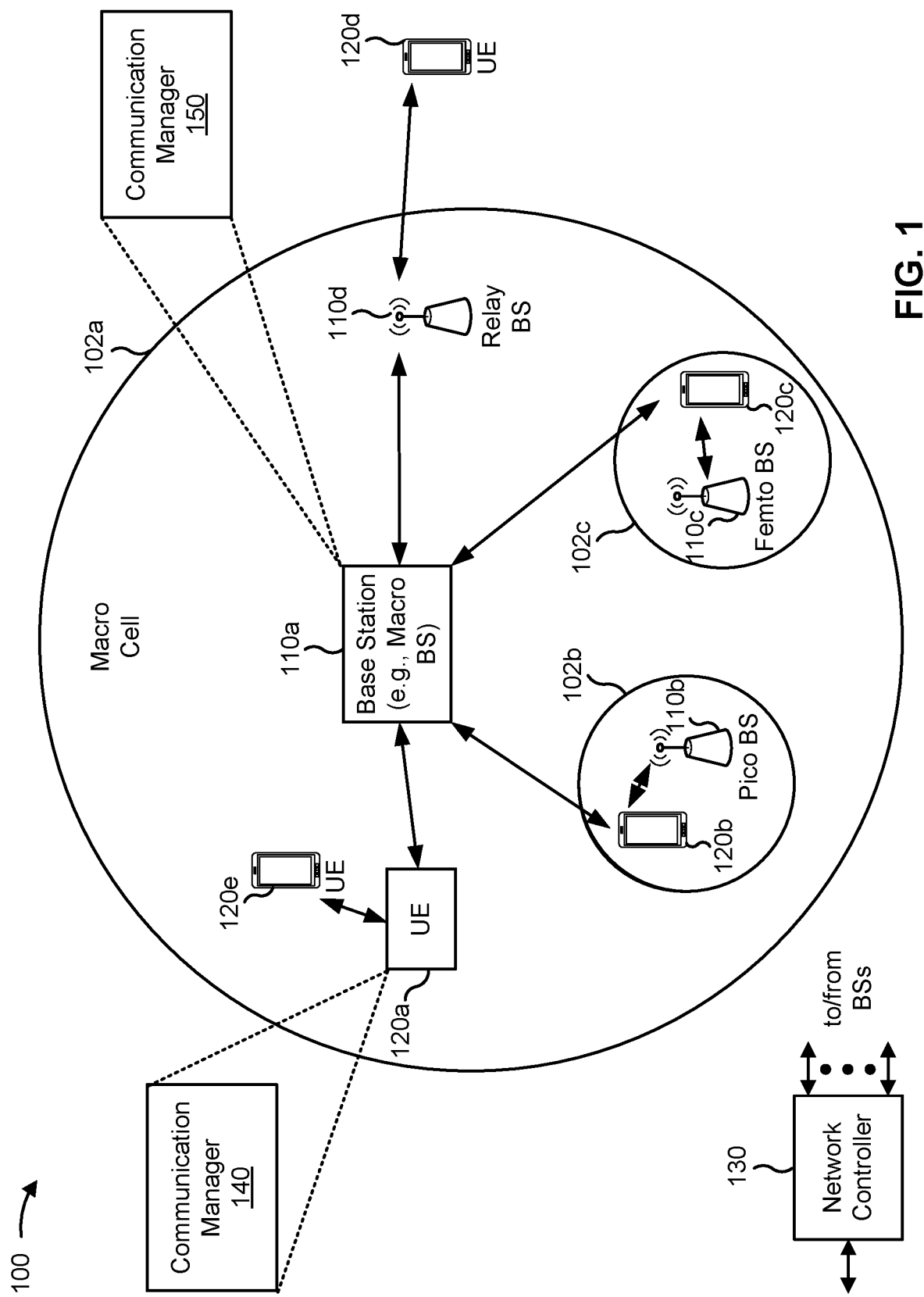
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the wireless device (e.g., base station 110 or UE 120) may include a communication manager 140 or 150. As described in more detail elsewhere herein, the communication manager 140 or 150 may map a TB across multiple CCs associated with at least one slot of time-frequency resources; and transmit the TB based at least in part on mapping the TB. Additionally, or alternatively, the communication manager 140 or 150 may perform one or more other operations described herein.

In some aspects, the wireless device (e.g., base station 110 or UE 120) may include a communication manager 140 or 150. As described in more detail elsewhere herein, the communication manager 140 or 150 may receive a TB transmitted across multiple CCs associated with at least one slot of time-frequency resources; and process the TB based on the TB being mapped across the multiple CCs. Additionally, or alternatively, the communication manager 140 or 150 may perform one or more other operations described herein.

As indicated above, FIG. 1 is provided as an example. Other examples may differ from what is described with regard to FIG. 1.

Figure 2:
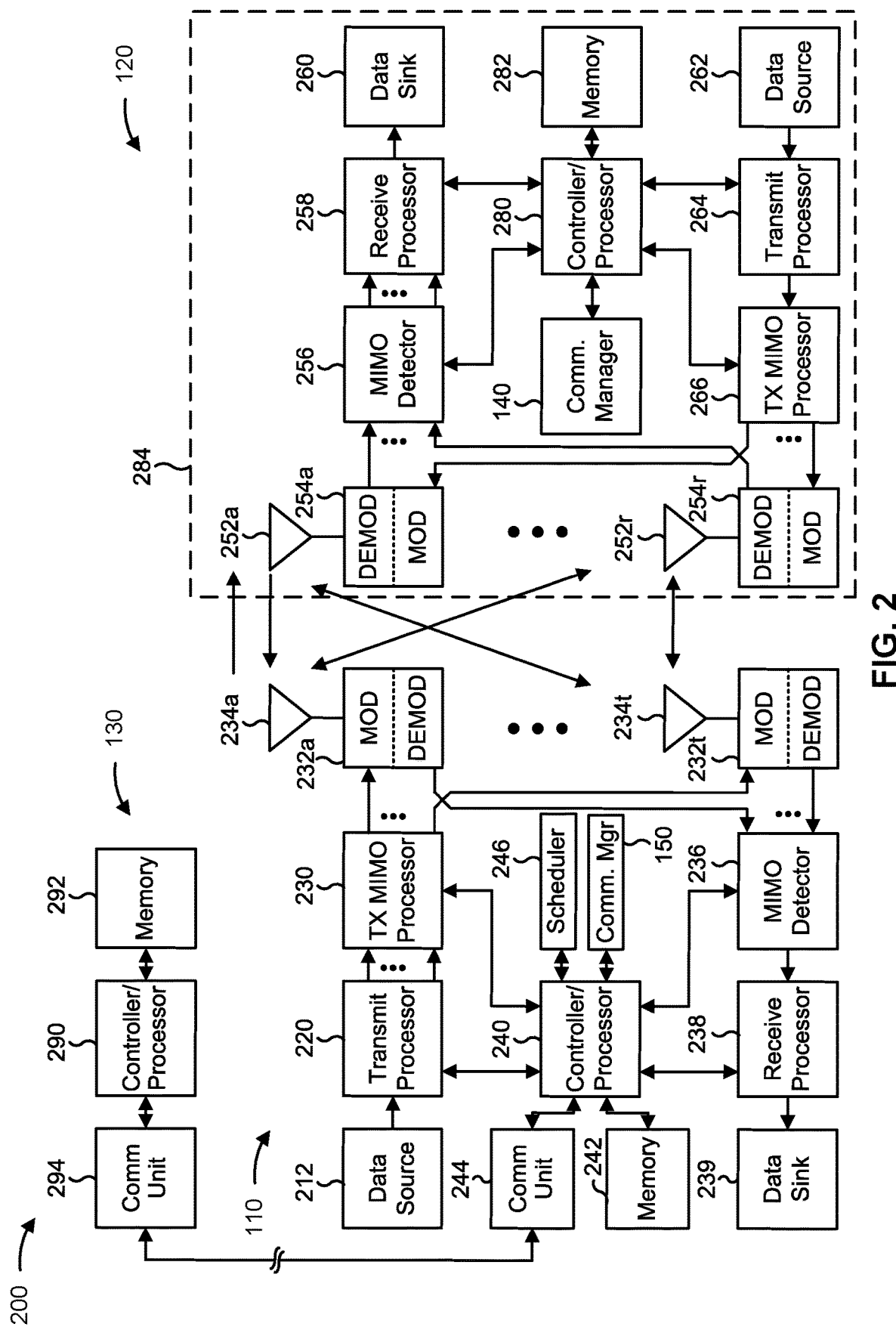
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-10).

The controller/processor 240 of the base station 110, the controller/processor 280 of the UE 120, and/or any other component(s) of FIG. 2 may perform one or more techniques associated with communication of a TB across multiple CCs, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the wireless device (e.g., base station 110 or UE 120) includes means for mapping a TB across multiple CCs associated with at least one slot of time-frequency resources; and/or means for transmitting the TB based at least in part on mapping the TB. In some aspects, the means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the wireless device (e.g., base station 110 or UE 120) includes means for receiving a TB transmitted across multiple CCs associated with at least one slot of time-frequency resources; and/or means for processing the TB based on the TB being mapped across the multiple CCs. In some aspects, the means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

FIGS. 3A-3G are diagrams illustrating examples 300, 310, 320, 330, 340, 350, 370 of FD communication, in accordance with the present disclosure. The example 300 of FIG. 3A includes a UE1 302 and two base stations (e.g., TRPs) 304-1, 304-2, where the UE1 302 is sending UL transmissions to base station 304-1 and is receiving DL transmissions from base station 304-2. In the example 300 of FIG. 3A, FD is enabled for the UE1 302, but not for the base stations 304-1, 304-2. The example 310 of FIG. 3B includes two UEs, shown as UE1 302-1 and UE2 302-2, and a base station 304, where the UE1 302-1 is receiving a DL transmission from the base station 304 and the UE2 302-2 is transmitting an UL transmission to the base station 304. In the example 310 of FIG. 3B, FD is enabled for the base station 304, but not for UE1 302-1 and UE2 302-2. The example 320 of FIG. 3C includes a UE1 302 and a base station 304, where the UE1 302 is receiving a DL transmission from the base station 304 and the UE1 302 is transmitting an UL transmission to the base station 304. In the example 320 of FIG. 3C, FD is enabled for both the UE1 302 and the base station 304.

FD communication may be in-band FD (IBFD) and/or sub-band FD (SBFD). For IBFD, a UE (e.g., UE1 302-1 and/or UE 302-2) and/or a base station (e.g., base station 304-1 and/or base station 304-2) may transmit and receive on the same time and frequency resource. The UL and the DL may share one or more frequency resources and/or time resources. In some cases, as shown by example 330 of FIG. 3D, the resources of the DL and the UL may fully overlap. In some cases, as shown by example 340 of FIG. 3E, the resources of the DL and the UL may partially overlap.

Figure 3E:
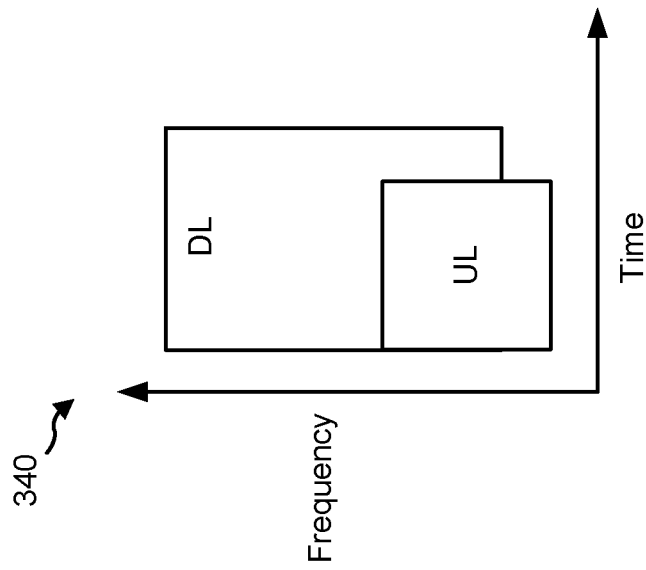
Figure 3D:
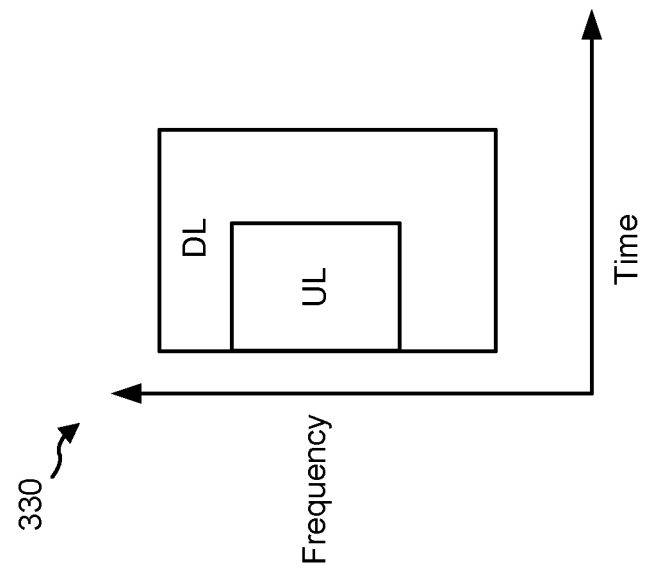
Figure 3F:
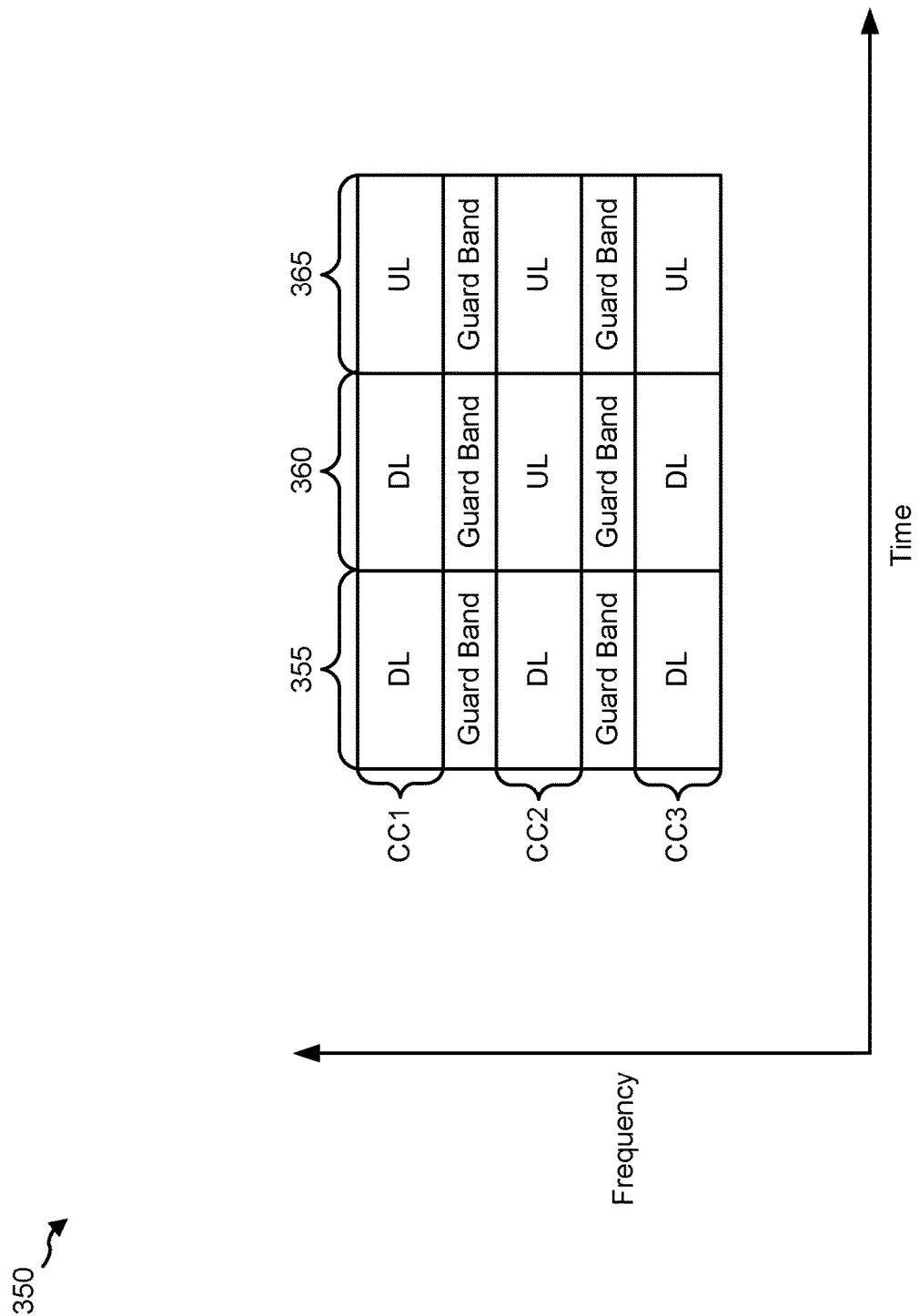

As shown by example 350 of FIG. 3F, for SBFD, a UE (e.g., UE1 302-1 and/or UE 302-2) and/or a base station (e.g., base station 304-1 and/or base station 304-2) may transmit and receive at the same time (e.g., during a same time slot, such as time slot 355, time slot 360, and/or time slot 360) but on different frequencies (e.g., via different CCs (e.g., CC1, CC2, CC3)). In some cases, to reduce self-interference between UL and DL transmissions, base-station-to-base-station interference, and/or UE-to-UE interference, in each time slot frequency, resources may be separated in the frequency domain. For example, as shown in FIG. 3F, a guard band may be implemented between different CCs. The guard band may include a small amount of frequency resources (e.g., 0-10 resource blocks) occurring between frequency resources of the different CCs.

In some cases, a group of CCs for a time slot may be allocated for UL or DL transmissions. For example, for time slot 355, CC1, CC2, and CC3 are allocated for DL transmissions. As another example, for time slot 360, CC1 and CC3 are allocated for DL transmissions. As yet another example, for time slot 365, CC1, CC2, and CC3 are allocated for UL transmissions.

Figure 3G:
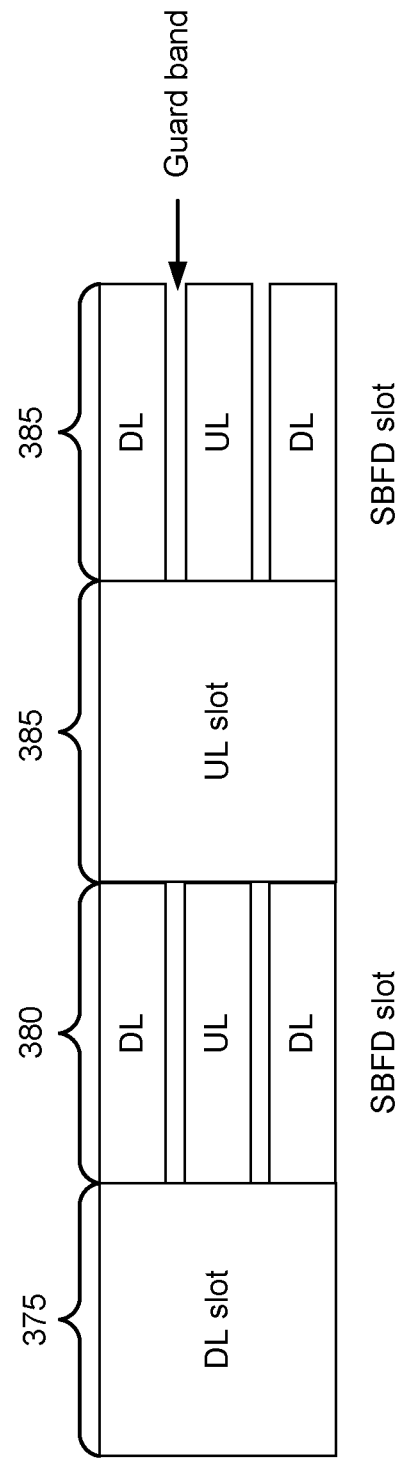

As shown by example 370 of FIG. 3G, in some cases, communications between devices may be a mix of FD and half-duplex (HD) slots, such that some slots are for UL or DL only (e.g., with or without aggregated CCs) while other slots are FD. For example, time slot 375 may be an HD slot allocated for DL transmissions, time slots 380 and 390 may be FD slots allocated for a mix of UL and DL transmissions, and time slot 385 may be an HD slot allocated for UL transmissions.

In some cases, for a particular time slot, each CC may be allocated for the same type of transmission (e.g., DL transmission) and may have the same configuration. However, each CC may be treated as being independent from the other CCs, which may require each CC to be independently configured. For example, each CC may be configured to carry separate TBs, use separate code block groups (CBGs), and/or use separate hybrid automatic repeat request (HARQ) identifiers for HARQ acknowledgment, among other examples. Independently configuring each CC may increase signaling relative to configuring the CCs as a single resource. Further, the frequency resources allocated to the guard bands may not be available to be utilized for the transmission, which may reduce spectrum efficiency.

As indicated above, FIGS. 3A-3G are provided as one or more examples. Other examples may differ from what is described with regard to FIGS. 3A-3G.

Some techniques and apparatuses described herein enable communicating a TB across multiple CCs. For example, a transmitting wireless device (e.g., a base station 110 or UE 120) may map a single TB across multiple CCs that are associated with at least one slot of time-frequency resources. Each CC may be associated with a separate modulation and coding scheme (MCS) and a subset of CBGs for the TB. A recipient wireless device (e.g., a base station 110 or UE 120) may receive the TB and process the TB based on the TB being mapped across the multiple CCs. As a result, devices communicating via multiple CCs (e.g., as in FD communications) may communicate with improved spectrum efficiency and reduced overhead, avoiding the need to transport TBs on separate CCs, separately configure each CC with separate CBGs, use separate resources for HARQ feedback, and/or the like. The reduced signaling and overhead may also lead to increased bandwidth, and the increased spectrum efficiency may lead to saving processing and power consumption resources by transmitting and receiving devices in situations where communication and processing frequency is reduced by the increased efficiency of communications.

Figure 4:
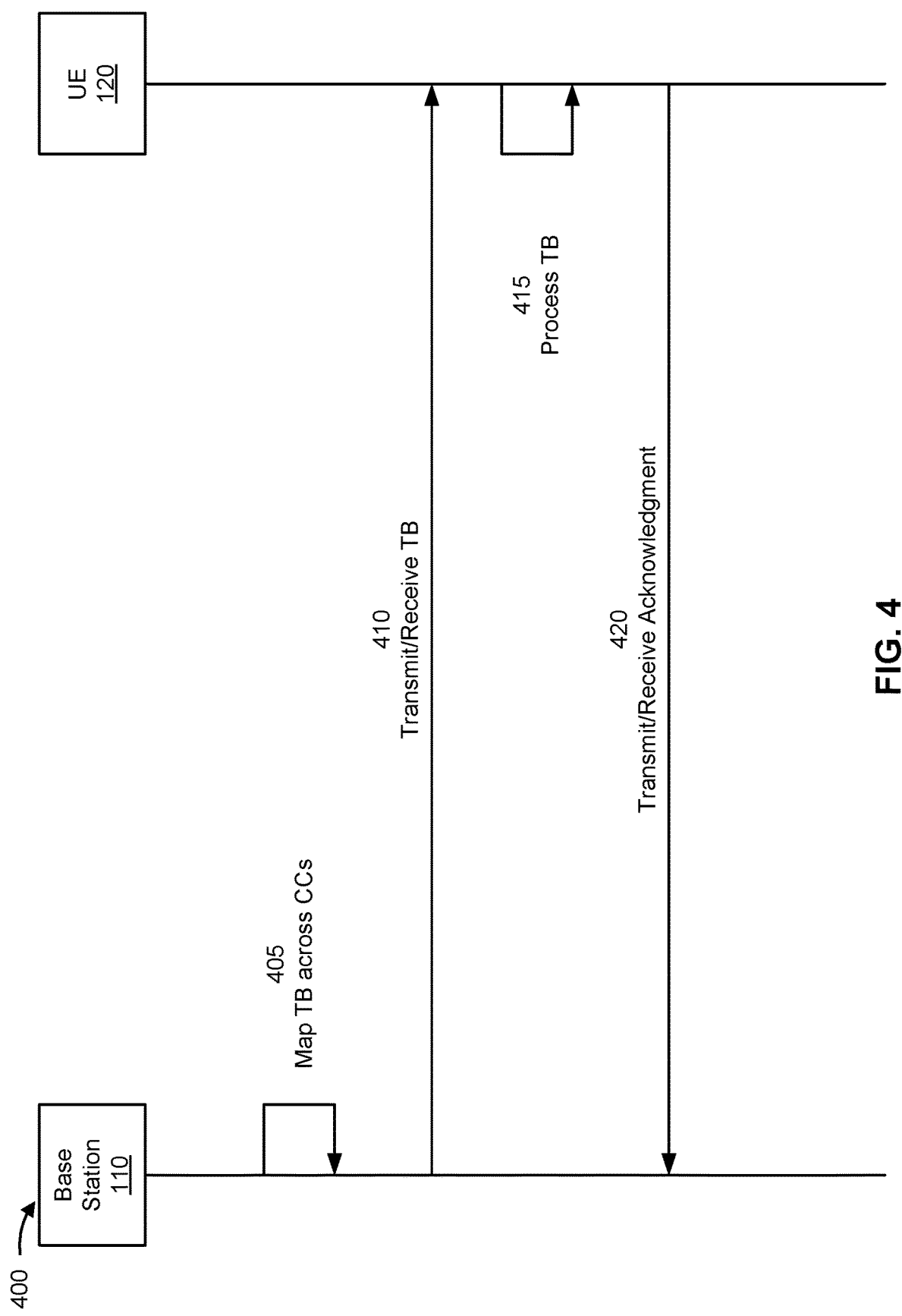
FIG. 4 is a diagram illustrating an example associated with communication of a transport block across multiple component carriers, in accordance with the present disclosure.

FIG. 4 is a diagram illustrating an example 400 associated with communication of a TB across multiple CCs, in accordance with the present disclosure. As shown in FIG. 4, a base station 110 and a UE 120 may communicate with one another. While various actions are described as being performed by the base station 110 and the UE 120, in some aspects the actions may be reversed. For example, the UE 120 may perform the actions described as being performed by the base station 110, and the base station 110 may perform the actions described as being performed by the UE 120.

As shown by reference number 405, the base station may map a TB across multiple CCs associated with at least one slot of time-frequency resources. In some aspects, the TB may be mapped by frequency first, then time, and the TB may be mapped across multiple CCs in a single slot or multiple CCs across multiple contiguous slots.

In some aspects, the at least one slot includes an FD slot. As described herein, the FD slot may have multiple CCs, one or more for UL transmissions and one or more for DL transmissions, and each CC may be separated by a guard band. In some aspects, the at least one slot includes an HD slot. As described herein, the HD slot may include multiple CCs, but each of the CCs in an HD slot are either all allocated for UL transmissions or all allocated for DL transmissions. In some cases, the CCs in an HD slot may still be separated by a guard band.

In some aspects, the base station may map a first contiguous portion of the TB across the multiple CCs for a first time resource of multiple time resources associated with a slot, and map a second contiguous portion of the TB across the multiple CCs for a second time resource of the multiple time resources. For example, rather than filling a CC with TB data in a slot before moving to the next CC, the base station may fill a portion of the one CC within the slot (e.g., a symbol or other segment of time within the slot) with TB data, then continue mapping TB data to a portion of another CC in the same time resource (e.g., the same symbol or other segment of time within the slot) (e.g., as shown with respect to example 500 of FIG. 5).

In some aspects, the base station may map a first contiguous portion of the TB to a first set of resources of a first CC of the multiple CCs, and map a second contiguous portion of the TB to a second set of resources of a second CC of the multiple CCs. For example, the base station may fill a CC, within a slot, with TB data before moving to the next CC in the same slot to continue mapping the TB (e.g., as shown with respect to example 510 of FIG. 5). In some aspects, the order in which the CCs of a slot are mapped may be based at least in part on a radio resource control (RRC) configuration indicating the order in which CCs should be mapped and/or a center frequency of the time-frequency resources (e.g., resources closest to, or furthest from, the center frequency may be mapped first).

In some aspects, each CC may be associated with a corresponding subset of CBGs. For example, if a particular slot includes two CCs and the TB has 10 CBGs, a first portion of the CBGs (e.g., CBGs 1-3) may be included in a first CC while a second portion of the CBGs (e.g., CBGs 4-10) may be included in a second CC. In some aspects, a first CC of the multiple CCs may be associated with a first contiguous subset of the CBGs, and a second CC of the multiple CCs may be associated with a second contiguous subset of the CBGs.

In some aspects, each subset of the CBGs, and/or each of the CCs, is associated with a corresponding modulation and coding scheme (MCS). For example, the MCS for each CC may be selected based on the channel conditions of the CC. In some aspects, the base station may determine which of the CBGs are to be included in which of the multiple CCs based at least in part on available resources of the multiple CCs and an MCS of each of the multiple CCs. For example, an MCS may affect data rate and error rate of transmissions, which may enable some CCs to carry more data than other CCs.

In some aspects, data associated with the TB (e.g., downlink control information (DCI)) may indicate a first CBG of the first contiguous subset of the CBGs and a second CBG of the second contiguous subset of the CBGs. By indicating the first CBG of each subset of CBGs, the receiver may be able to identify which subset of CBGs are mapped to which CCs.

As shown by reference number 410, the base station may transmit, and the UE may receive, the TB. The TB may be mapped across multiple CCs, as described herein, and in some aspects, across multiple slots as well.

As shown by reference number 415, the UE may process the TB. For example, as described herein, the UE may demodulate and decode the communication that includes the TB to further process the TB.

As shown by reference number 420, the UE may transmit, and the base station may receive, an acknowledgment associated with reception of the TB. For example, the UE may transmit a HARQ acknowledgment (HARQ-ACK), as described herein. In some aspects, the UE may transmit separate HARQ-ACKs for each CC. For example, each CC may be associated with a separate HARQ identifier, enabling HARQ-ACK feedback for each CC. In some aspects, the UE may transmit one HARQ-ACK for the TB. Whether the UE transmits one or multiple HARQ-ACKs may depend on whether the TB includes a HARQ identifier for the TB or separate HARQ identifiers for each CC.

As indicated above, FIG. 4 is provided as an example. Other examples may differ from what is described with respect to FIG. 4.

Figure 5:
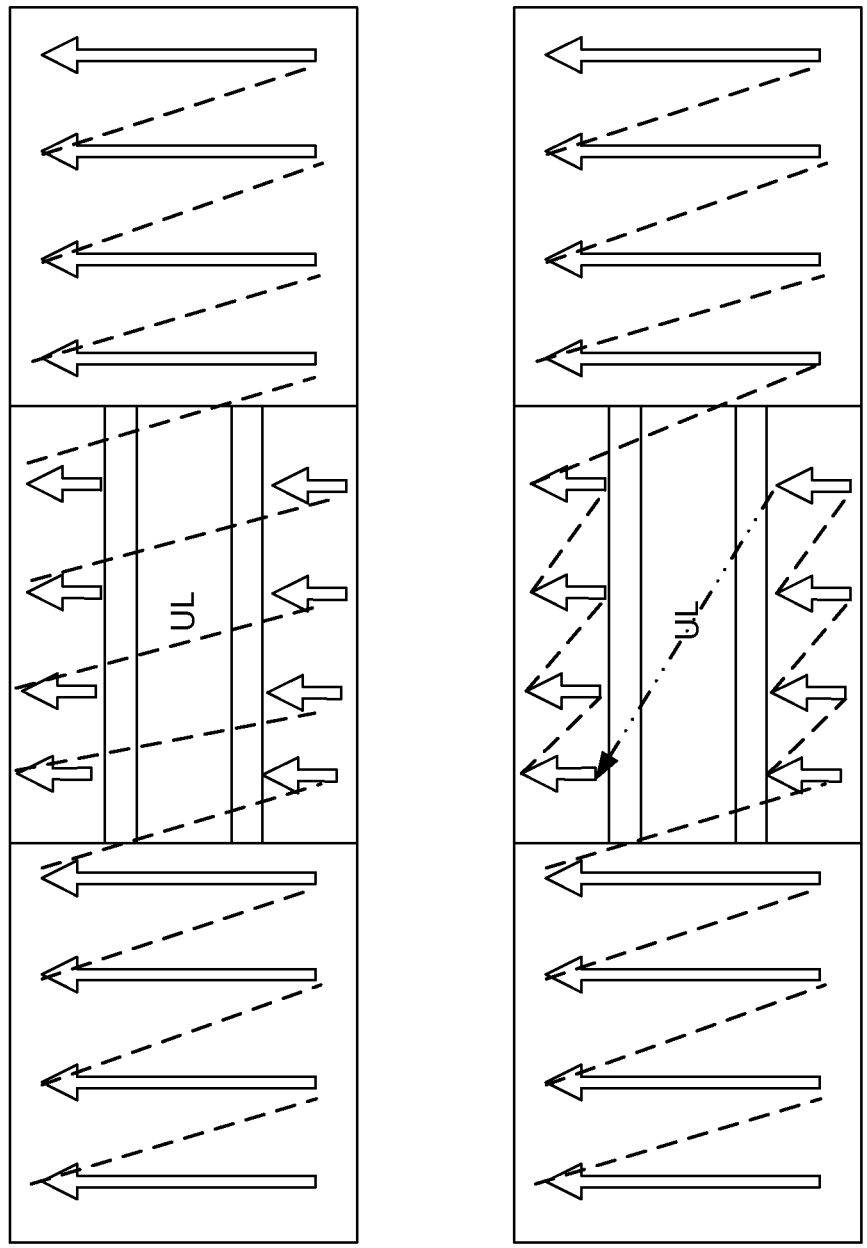
FIG. 5 is a diagram illustrating examples associated with mapping a TB across multiple CCs, in accordance with the present disclosure.

FIG. 5 is a diagram illustrating examples 500, 510 associated with mapping a TB across multiple CCs, in accordance with the present disclosure. The example 500 of FIG. 5 depicts a TB mapped across two HD slots with an FD slot in between. For the CCs of the FD slot, the TB data is mapped in frequency first, then time, by filling a portion of one CC within the slot (e.g., a portion of the bottom CC depicted in example 500) with TB data, then continuing to map the TB data to a portion of another CC in the same time resource (e.g., a portion of the top CC depicted in example 500).

The example 510 of FIG. 5 depicts a TB mapped across two HD slots with an FD slot in between. For the CCs of the FD slot, the TB data is mapped in frequency first, then time, by filling a CC, within a slot, with TB data before moving to the next CC in the same slot to continue mapping the TB data.

As indicated above, FIG. 5 is provided as an example. Other examples may differ from what is described with respect to FIG. 5.

Figure 6:
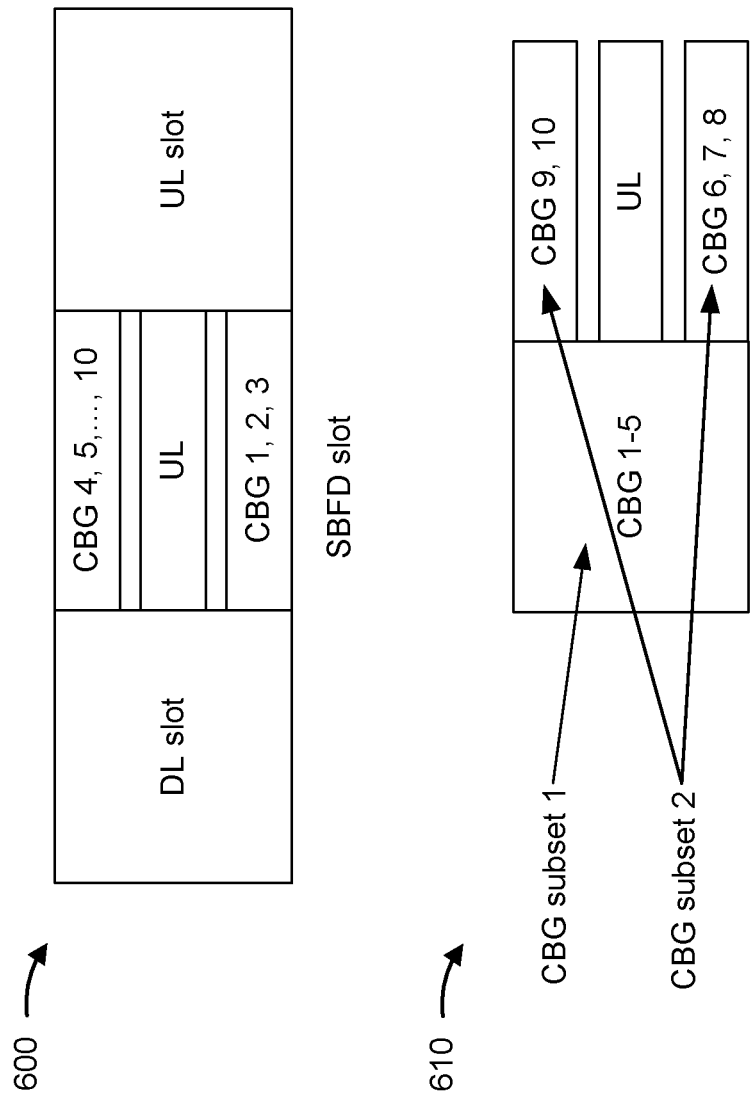
FIG. 6 is a diagram illustrating examples associated with mapping code block groups of a TB across multiple CCs, in accordance with the present disclosure.

FIG. 6 is a diagram illustrating examples 600, 610 associated with mapping CBGs of a TB across multiple CCs, in accordance with the present disclosure. The example 600 of FIG. 6 depicts CBGs of a TB mapped across two CCs of one FD slot. For the CCs of the FD slot, a first contiguous group of CBGs (e.g., CBGs 1, 2, and 3) is mapped to one CC (e.g., the bottom CC), and a second contiguous group of CBGs (e.g., CBGs 4-10) is mapped to another CC (e.g., the top CC).

The example 610 of FIG. 6 depicts CBGs of a TB mapped across one HD slot and two CCs of one FD slot. For the HD slot, a first subset of contiguous CBGs (e.g., CBGs 1-5) is mapped across the HD slot. For the CCs of the FD slot, a second subset of the contiguous CBGs (e.g., CBGs 6-10) is split between the CCs of the FD slot, such that a first portion of the second subset of the contiguous CBGs (e.g., CBGs 6-8) is mapped to one CC (e.g., the bottom CC), and a second portion of the second subset of the contiguous CBGs (e.g., CBGs 9 and 10) is mapped to another CC (e.g., the top CC).

As indicated above, FIG. 6 is provided as an example. Other examples may differ from what is described with respect to FIG. 6.

Figure 7:
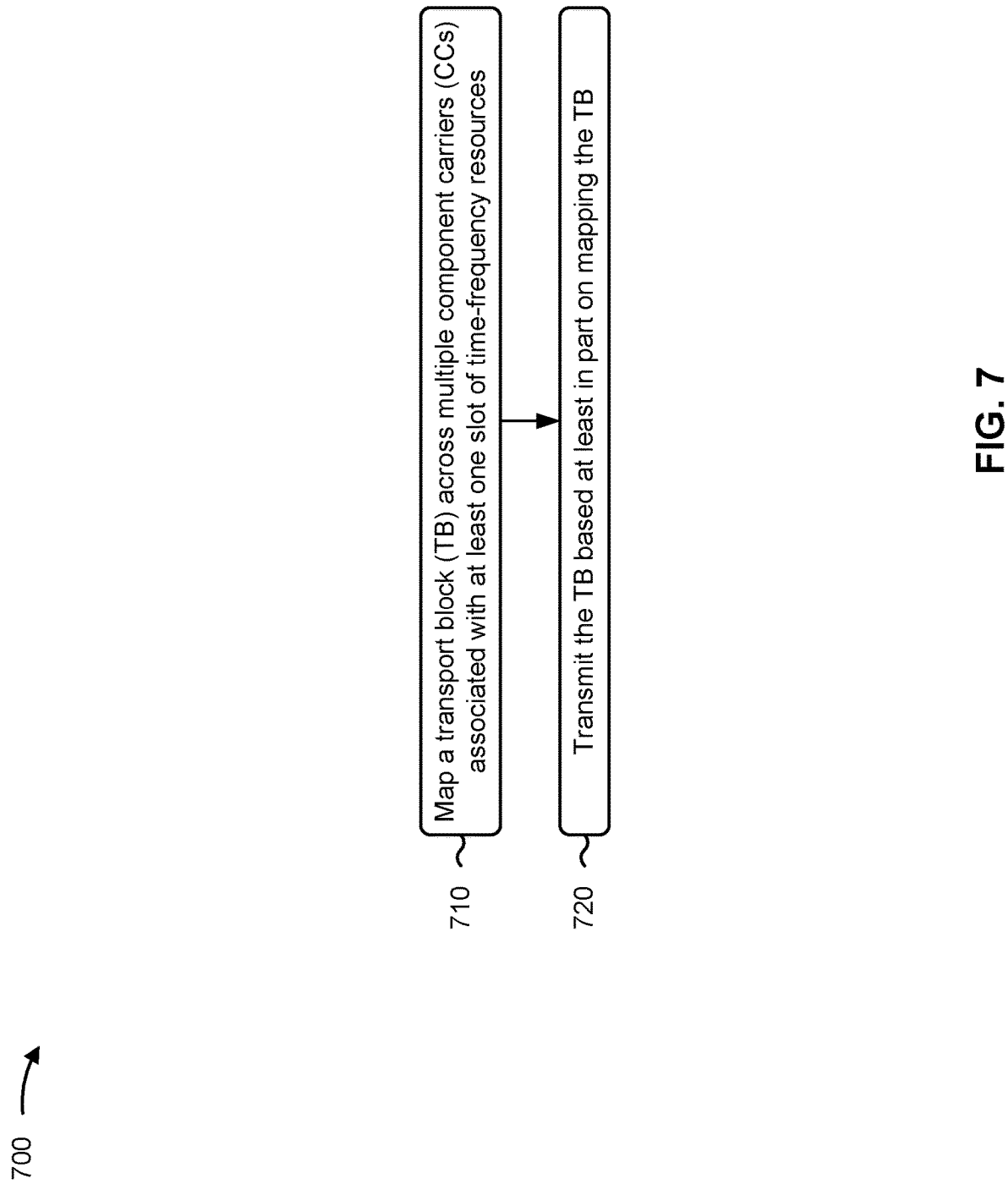
FIGS. 7 and 8 are diagrams illustrating example processes associated with communication of a transport block across multiple component carriers, in accordance with the present disclosure.

FIG. 7 is a diagram illustrating an example process 700 performed, for example, by a wireless device, in accordance with the present disclosure. Example process 700 is an example where the wireless device (e.g., base station 110 or UE 120) performs operations associated with communication of a TB across multiple CCs.

As shown in FIG. 7, in some aspects, process 700 may include mapping a TB across multiple CCs associated with at least one slot of time-frequency resources (block 710). For example, the wireless device (e.g., using communication manager 140 or 150 and/or transmission component 904 or 1004, depicted in FIGS. 9 and 10) may map a TB across multiple CCs associated with at least one slot of time-frequency resources, as described above.

As further shown in FIG. 7, in some aspects, process 700 may include transmitting the TB based at least in part on mapping the TB (block 720). For example, the wireless device (e.g., using communication manager 140 and/or 150 and/or transmission component 904 or 1004, depicted in FIGS. 9 and 10) may transmit the TB based at least in part on mapping the TB, as described above.

Process 700 may include additional aspects, such as any single aspect or any combination of aspects described below and/or in connection with one or more other processes described elsewhere herein.

In a first aspect, the at least one slot comprises at least one full-duplex slot.

In a second aspect, alone or in combination with the first aspect, the at least one slot further comprises at least one half-duplex slot.

In a third aspect, alone or in combination with one or more of the first and second aspects, mapping the TB across multiple CCs comprises mapping a first contiguous portion of the TB across the multiple CCs for a first time resource of multiple time resources associated with a slot of the at least one slot, and mapping a second contiguous portion of the TB across the multiple CCs for a second time resource of the multiple time resources.

In a fourth aspect, alone or in combination with one or more of the first through third aspects, mapping the TB across the multiple CCs comprises mapping a first contiguous portion of the TB to a first set of resources of a first CC of the multiple CCs, and mapping a second contiguous portion of the TB to a second set of resources of a second CC of the multiple CCs.

In a fifth aspect, alone or in combination with one or more of the first through fourth aspects, an order in which the multiple CCs are mapped is based at least in part on at least one of a radio resource control configuration, or a center frequency of the time-frequency resources.

In a sixth aspect, alone or in combination with one or more of the first through fifth aspects, each CC of the multiple CCs is associated with a corresponding subset of CBGs.

In a seventh aspect, alone or in combination with one or more of the first through sixth aspects, each corresponding subset of the CBGs is associated with a corresponding modulation and coding scheme.

In an eighth aspect, alone or in combination with one or more of the first through seventh aspects, a first CC of the multiple CCs is associated with a first contiguous subset of the CBGs, and a second CC of the multiple CCs is associated with a second contiguous subset of the CBGs.

In a ninth aspect, alone or in combination with one or more of the first through eighth aspects, downlink control information associated with the TB indicates a first CBG of the first contiguous subset of the CBGs and a second CBG of the second contiguous subset of the CBGs.

In a tenth aspect, alone or in combination with one or more of the first through ninth aspects, process 700 includes determining which of the CBGs are to be included in which of the multiple CCs based at least in part on available resources of the multiple CCs and a modulation and coding scheme of each of the multiple CCs.

In an eleventh aspect, alone or in combination with one or more of the first through tenth aspects, process 700 includes receiving separate HARQ-ACKs for each of the multiple CCs.

In a twelfth aspect, alone or in combination with one or more of the first through eleventh aspects, process 700 includes receiving a HARQ-ACK for the TB.

In a thirteenth aspect, alone or in combination with one or more of the first through twelfth aspects, the at least one slot comprises a half-duplex slot and a full-duplex slot, wherein a first subset of CBGs is mapped to the half-duplex slot, wherein a second subset of the CBGs is mapped to a first CC of the multiple CCs for the full-duplex slot, and wherein a third subset of the CBGs is mapped to a second CC of the multiple CCs for the full-duplex slot.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:

FIG. 8 is a diagram illustrating an example process 800 performed, for example, by a wireless device, in accordance with the present disclosure. Example process 800 is an example where the wireless device (e.g., base station 110 or UE 120) performs operations associated with communication of a TB across multiple CCs.

As shown in FIG. 8, in some aspects, process 800 may include receiving a TB transmitted across multiple CCs associated with at least one slot of time-frequency resources (block 810). For example, the wireless device (e.g., using communication manager 140 and/or 150 and/or reception component 902 or 1002, depicted in FIGS. 9 and 10) may receive a TB transmitted across multiple CCs associated with at least one slot of time-frequency resources, as described above.

As further shown in FIG. 8, in some aspects, process 800 may include processing the TB based on the TB being mapped across the multiple CCs (block 820). For example, the wireless device (e.g., using communication manager 140 and/or 150 and/or reception component 902 or 1002, depicted in FIGS. 9 and 10) may process the TB based on the TB being mapped across the multiple CCs, as described above.

Process 800 may include additional aspects, such as any single aspect or any combination of aspects described below and/or in connection with one or more other processes described elsewhere herein.

In a first aspect, the at least one slot comprises at least one full-duplex slot.

In a second aspect, alone or in combination with the first aspect, the at least one slot further comprises at least one half-duplex slot.

In a third aspect, alone or in combination with one or more of the first and second aspects, a first contiguous portion of the TB is mapped across the multiple CCs for a first time resource of multiple time resources associated with a slot of the at least one slot, and a second contiguous portion of the TB is mapped across the multiple CCs for a second time resource of the multiple time resources.

In a fourth aspect, alone or in combination with one or more of the first through third aspects, a first contiguous portion of the TB is mapped to a first set of resources of a first CC of the multiple CCs, and a second contiguous portion of the TB is mapped to a second set of resources of a second CC of the multiple CCs.

In a fifth aspect, alone or in combination with one or more of the first through fourth aspects, an order in which the multiple CCs are mapped is based at least in part on at least one of radio resource control configuration, or a center frequency of the time-frequency resources.

In a sixth aspect, alone or in combination with one or more of the first through fifth aspects, each CC of the multiple CCs is associated with a corresponding subset of CBGs.

In a seventh aspect, alone or in combination with one or more of the first through sixth aspects, each corresponding subset of the CBGs is associated with a corresponding modulation and coding scheme.

In an eighth aspect, alone or in combination with one or more of the first through seventh aspects, a first CC of the multiple CCs is associated with a first contiguous subset of the CBGs, and a second CC of the multiple CCs is associated with a second contiguous subset of the CBGs.

In a ninth aspect, alone or in combination with one or more of the first through eighth aspects, downlink control information associated with the TB indicates a first CBG of the first contiguous subset of the CBGs and a second CBG of the second contiguous subset of the CBGs.

In a tenth aspect, alone or in combination with one or more of the first through ninth aspects, process 800 includes determining which of the CBGs are included in which of the multiple CCs based at least in part on available resources of the multiple CCs and a modulation and coding scheme of each of the multiple CCs.

In an eleventh aspect, alone or in combination with one or more of the first through tenth aspects, process 800 includes transmitting separate HARQ-ACKs for each of the multiple CCs.

In a twelfth aspect, alone or in combination with one or more of the first through eleventh aspects, process 800 includes transmitting a HARQ-ACK for the TB.

In a thirteenth aspect, alone or in combination with one or more of the first through twelfth aspects, the at least one slot comprises a half-duplex slot and a full-duplex slot, wherein a first subset of CBGs is mapped to the half-duplex slot, wherein a second subset of the CBGs is mapped to a first CC of the multiple CCs for the full-duplex slot, and wherein a third subset of the CBGs is mapped to a second CC of the multiple CCs for the full-duplex slot.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
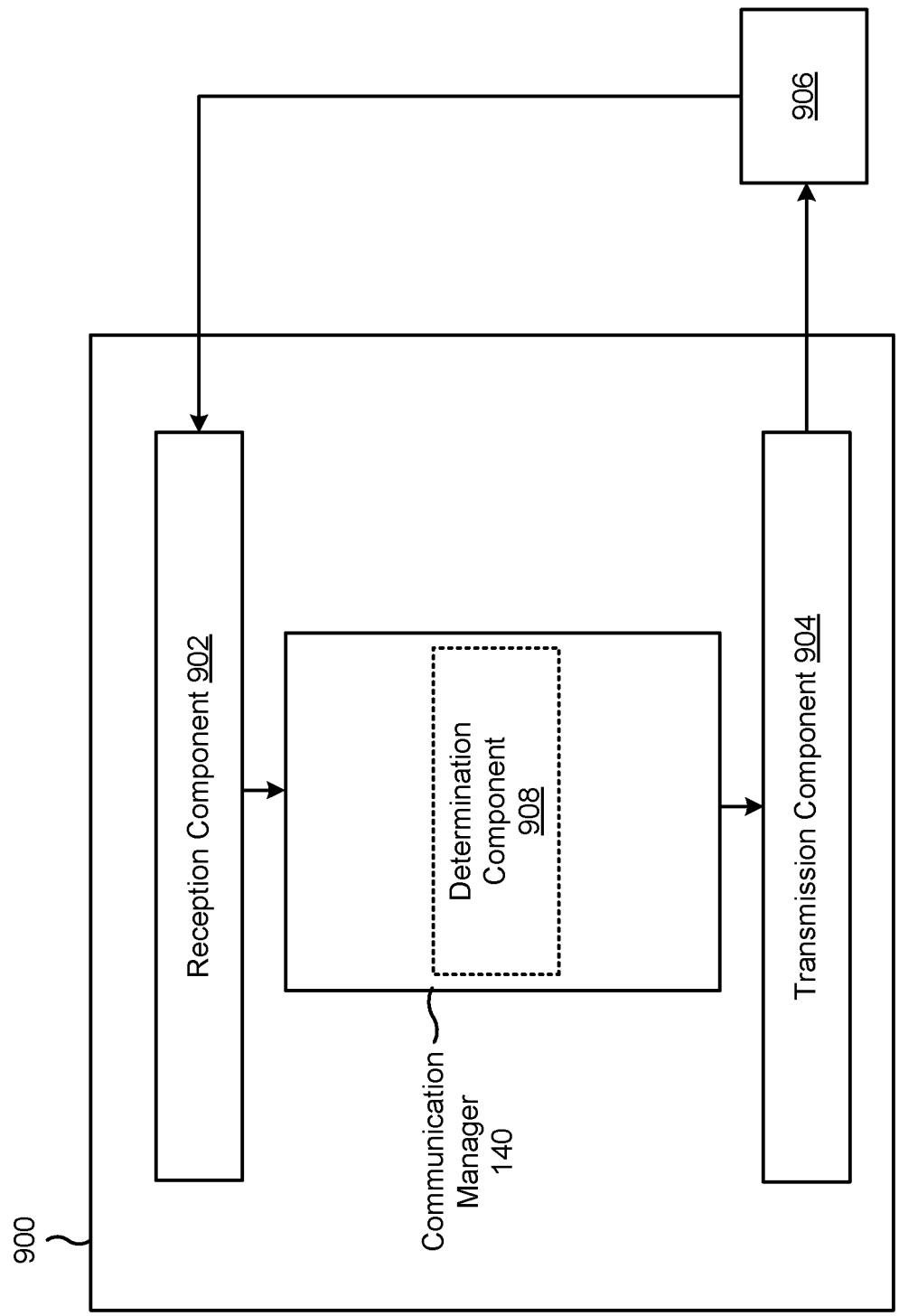
FIGS. 9 and 10 are diagrams of example apparatuses for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a determination component 908, among other examples.

In some aspects, the apparatus 900 may be configured to perform one or more operations described herein in connection with FIGS. 4-6. Additionally, or alternatively, the apparatus 900 may be configured to perform one or more processes described herein, such as process 700 of FIG. 7, process 800 of FIG. 8, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The transmission component 904 may map a TB across multiple CCs associated with at least one slot of time-frequency resources. The transmission component 904 may transmit the TB based at least in part on mapping the TB.

The determination component 908 may determine which of the CBGs are to be included in which of the multiple CCs based at least in part on available resources of the multiple CCs and a modulation and coding scheme of each of the multiple CCs.

The reception component 902 may receive separate HARQ-ACKs for each of the multiple CCs.

The reception component 902 may receive a HARQ-ACK for the TB.

The reception component 902 may receive a TB transmitted across multiple CCs associated with at least one slot of time-frequency resources. The reception component 902 may process the TB based on the TB being mapped across the multiple CCs.

The determination component 908 may determine which of the CBGs are included in which of the multiple CCs based at least in part on available resources of the multiple CCs and a modulation and coding scheme of each of the multiple CCs.

The transmission component 904 may transmit separate HARQ-ACKs for each of the multiple CCs.

The transmission component 904 may transmit a HARQ-ACK for the TB.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
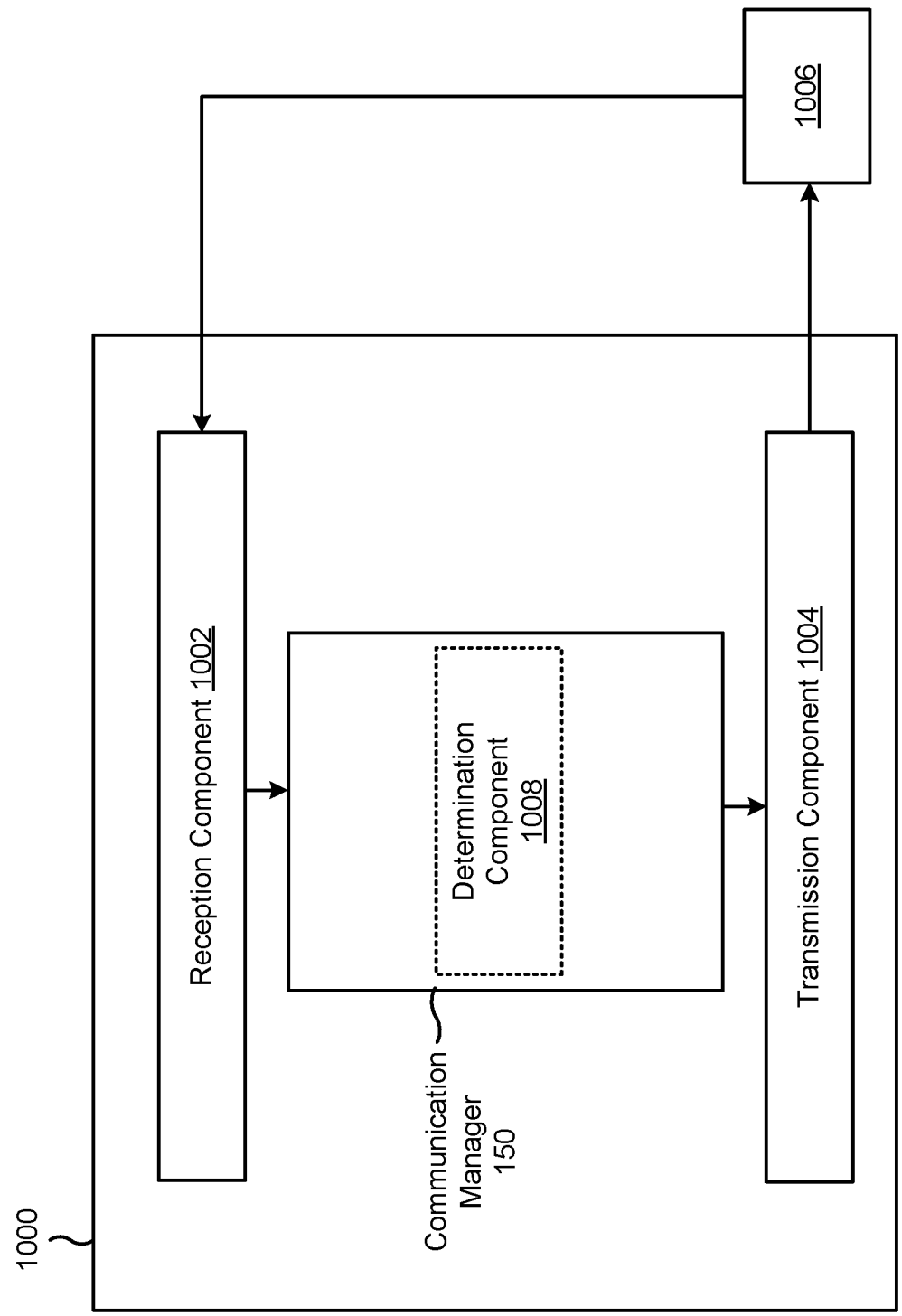

FIG. 10 is a diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include one or more of a determination component 1008, among other examples.

In some aspects, the apparatus 1000 may be configured to perform one or more operations described herein in connection with FIGS. 4-6. Additionally, or alternatively, the apparatus 1000 may be configured to perform one or more processes described herein, such as process 700 of FIG. 7, process 800 of FIG. 8, or a combination thereof. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The transmission component 1004 may map a TB across multiple CCs associated with at least one slot of time-frequency resources. The transmission component 1004 may transmit the TB based at least in part on mapping the TB.

The determination component 1008 may determine which of the CBGs are to be included in which of the multiple CCs based at least in part on available resources of the multiple CCs and a modulation and coding scheme of each of the multiple CCs.

The reception component 1002 may receive separate HARQ-ACKs for each of the multiple CCs.

The reception component 1002 may receive a HARQ-ACK for the TB.

The reception component 1002 may receive a TB transmitted across multiple CCs associated with at least one slot of time-frequency resources. The reception component 1002 may process the TB based on the TB being mapped across the multiple CCs.

The determination component 1008 may determine which of the CBGs are included in which of the multiple CCs based at least in part on available resources of the multiple CCs and a modulation and coding scheme of each of the multiple CCs.

The transmission component 1004 may transmit separate HARQ-ACKs for each of the multiple CCs.

The transmission component 1004 may transmit a HARQ-ACK for the TB.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a wireless device, comprising: mapping a TB across multiple CCs associated with at least one slot of time-frequency resources; and transmitting the TB based at least in part on mapping the TB.

Aspect 2: The method of Aspect 1, wherein the at least one slot comprises at least one full-duplex slot.

Aspect 3: The method of any of Aspects 1-2, wherein the at least one slot further comprises at least one half-duplex slot.

Aspect 4: The method of any of Aspects 1-3, wherein mapping the TB across multiple CCs comprises: mapping a first contiguous portion of the TB across the multiple CCs for a first time resource of multiple time resources associated with a slot of the at least one slot; and mapping a second contiguous portion of the TB across the multiple CCs for a second time resource of the multiple time resources.

Aspect 5: The method of any of Aspects 1-4, wherein mapping the TB across the multiple CCs comprises: mapping a first contiguous portion of the TB to a first set of resources of a first CC of the multiple CCs; and mapping a second contiguous portion of the TB to a second set of resources of a second CC of the multiple CCs.

Aspect 6: The method of Aspect 5, wherein an order in which the multiple CCs are mapped is based at least in part on at least one of: a radio resource control configuration, or a center frequency of the time-frequency resources.

Aspect 7: The method of any of Aspects 1-6, wherein each CC of the multiple CCs is associated with a corresponding subset of CBGs.

Aspect 8: The method of Aspect 7, wherein each corresponding subset of the CBGs is associated with a corresponding modulation and coding scheme.

Aspect 9: The method of any of Aspects 7-8, wherein a first CC of the multiple CCs is associated with a first contiguous subset of the CBGs, and wherein a second CC of the multiple CCs is associated with a second contiguous subset of the CBGs.

Aspect 10: The method of Aspect 9, wherein downlink control information associated with the TB indicates a first CBG of the first contiguous subset of the CBGs and a second CBG of the second contiguous subset of the CBGs.

Aspect 11: The method of any of Aspects 9-10, further comprising: determining which of the CBGs are to be included in which of the multiple CCs based at least in part on available resources of the multiple CCs and a modulation and coding scheme of each of the multiple CCs.

Aspect 12: The method of any of Aspects 1-11, further comprising: receiving separate HARQ-ACKs for each of the multiple CCs.

Aspect 13: The method of any of Aspects 1-11, further comprising: receiving a HARQ-ACK for the TB.

Aspect 14: The method of any of Aspects 1-13, wherein the at least one slot comprises a half-duplex slot and a full-duplex slot, wherein a first subset of CBGs is mapped to the half-duplex slot, wherein a second subset of the CBGs is mapped to a first CC of the multiple CCs for the full-duplex slot, and wherein a third subset of the CBGs is mapped to a second CC of the multiple CCs for the full-duplex slot.

Aspect 15: A method of wireless communication performed by a wireless device, comprising: receiving a TB transmitted across multiple CCs associated with at least one slot of time-frequency resources; and processing the TB based on the TB being mapped across the multiple CCs.

Aspect 16: The method of Aspect 15, wherein the at least one slot comprises at least one full-duplex slot.

Aspect 17: The method of Aspect 16, wherein the at least one slot further comprises at least one half-duplex slot.

Aspect 18: The method of any of Aspects 15-17, wherein a first contiguous portion of the TB is mapped across the multiple CCs for a first time resource of multiple time resources associated with a slot of the at least one slot; and wherein a second contiguous portion of the TB is mapped across the multiple CCs for a second time resource of the multiple time resources.

Aspect 19: The method of any of Aspects 15-18, wherein a first contiguous portion of the TB is mapped to a first set of resources of a first CC of the multiple CCs; and wherein a second contiguous portion of the TB is mapped to a second set of resources of a second CC of the multiple CCs.

Aspect 20: The method of Aspect 19, wherein an order in which the multiple CCs are mapped is based at least in part on at least one of: radio resource control configuration, or a center frequency of the time-frequency resources.

Aspect 21: The method of any of Aspects 15-20, wherein each CC of the multiple CCs is associated with a corresponding subset of CBGs.

Aspect 22: The method of Aspect 21, wherein each corresponding subset of the CBGs is associated with a corresponding modulation and coding scheme.

Aspect 23: The method of any of Aspects 21-22, wherein a first CC of the multiple CCs is associated with a first contiguous subset of the CBGs, and wherein a second CC of the multiple CCs is associated with a second contiguous subset of the CBGs.

Aspect 24: The method of Aspect 23, wherein downlink control information associated with the TB indicates a first CBG of the first contiguous subset of the CBGs and a second CBG of the second contiguous subset of the CBGs.

Aspect 25: The method of any of Aspects 23-24, further comprising: determining which of the CBGs are included in which of the multiple CCs based at least in part on available resources of the multiple CCs and a modulation and coding scheme of each of the multiple CCs.

Aspect 26: The method of any of Aspects 15-25, further comprising: transmitting separate HARQ-ACKs for each of the multiple CCs.

Aspect 27: The method of any of Aspects 15-25, further comprising: transmitting a HARQ-ACK for the TB.

Aspect 28: The method of any of Aspects 15-27, wherein the at least one slot comprises a half-duplex slot and a full-duplex slot, wherein a first subset of CBGs is mapped to the half-duplex slot, wherein a second subset of the CBGs is mapped to a first CC of the multiple CCs for the full-duplex slot, and wherein a third subset of the CBGs is mapped to a second CC of the multiple CCs for the full-duplex slot.

Aspect 29: An apparatus for wireless communication at a device, comprising a processor; memory coupled with the processor; and instructions stored in the memory and executable by the processor to cause the apparatus to perform the method of one or more of Aspects 1-14.

Aspect 30: An apparatus for wireless communication at a device, comprising a processor; memory coupled with the processor; and instructions stored in the memory and executable by the processor to cause the apparatus to perform the method of one or more of Aspects 15-28.

Aspect 31: A device for wireless communication, comprising a memory and one or more processors coupled to the memory, the one or more processors configured to perform the method of one or more of Aspects 1-14.

Aspect 32: A device for wireless communication, comprising a memory and one or more processors coupled to the memory, the one or more processors configured to perform the method of one or more of Aspects 15-28.

Aspect 33: An apparatus for wireless communication, comprising at least one means for performing the method of one or more of Aspects 1-14.

Aspect 34: An apparatus for wireless communication, comprising at least one means for performing the method of one or more of Aspects 15-28.

Aspect 35: A non-transitory computer-readable medium storing code for wireless communication, the code comprising instructions executable by a processor to perform the method of one or more of Aspects 1-14.

Aspect 36: A non-transitory computer-readable medium storing code for wireless communication, the code comprising instructions executable by a processor to perform the method of one or more of Aspects 15-28.

Aspect 37: A non-transitory computer-readable medium storing a set of instructions for wireless communication, the set of instructions comprising one or more instructions that, when executed by one or more processors of a device, cause the device to perform the method of one or more of Aspects 1-14.

Aspect 38: A non-transitory computer-readable medium storing a set of instructions for wireless communication, the set of instructions comprising one or more instructions that, when executed by one or more processors of a device, cause the device to perform the method of one or more of Aspects 15-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless device for wireless communication, comprising:
    one or more memories; and
    one or more processors, coupled to the one or more memories, individually or collectively configured to cause the wireless device to:
        map a transport block (TB) across multiple component carriers (CCs) of at least one slot, comprising at least one full-duplex slot, of time-frequency resources,
            wherein an order in which the TB is mapped across the multiple CCs of the at least one slot, including the at least one full-duplex slot, is based at least in part on a center frequency of the time-frequency resources,
            wherein the TB is first mapped to a first time-frequency resource, corresponding to a first CC, of the time-frequency resources prior to a second time-frequency resource, corresponding to a second CC, based at least in part on the first time-frequency resource being closer to or further from the center frequency relative to the second time-frequency resource; and
        transmit the TB based at least in part on mapping the TB.

2. The wireless device of claim 1, wherein the at least one slot further comprises at least one half-duplex slot.

3. The wireless device of claim 1, wherein the one or more processors, to map the TB across multiple CCs, are individually or collectively configured to cause the wireless device to:
    map a first contiguous portion of the TB across the multiple CCs for a first time resource of multiple time resources associated with a slot of the at least one slot; and
    map a second contiguous portion of the TB across the multiple CCs for a second time resource of the multiple time resources.

4. The wireless device of claim 1, wherein the one or more processors, to map the TB across the multiple CCs, are individually or collectively configured to cause the wireless device to:

map a first contiguous portion of the TB to a first set of resources of a first CC of the multiple CCs; and map a second contiguous portion of the TB to a second set of resources of a second CC of the multiple CCs.

5. The wireless device of claim 4, wherein the order in which the multiple CCs are mapped is further based at least in part on:

a radio resource control configuration.

6. The wireless device of claim 1, wherein each CC of the multiple CCs is associated with a corresponding subset of code block groups (CBGs).

7. The wireless device of claim 6, wherein each corresponding subset of the CBGs is associated with a corresponding modulation and coding scheme.

8. The wireless device of claim 6, wherein a first CC of the multiple CCs is associated with a first contiguous subset of the CBGs, and wherein a second CC of the multiple CCs is associated with a second contiguous subset of the CBGs.

9. The wireless device of claim 8, wherein downlink control information associated with the TB indicates a first CBG of the first contiguous subset of the CBGs and a second CBG of the second contiguous subset of the CBGs.

10. The wireless device of claim 8, wherein the one or more processors are individually or collectively further configured to cause the wireless device to:

determine which of the CBGs are to be included in which of the multiple CCs based at least in part on available resources of the multiple CCs and a modulation and coding scheme of each of the multiple CCs.

11. The wireless device of claim 1, wherein the one or more processors are individually or collectively further configured to cause the wireless device to:

receive separate hybrid automatic repeat request (HARQ) acknowledgments (HARQ-ACKs) for each of the multiple CCs.

12. The wireless device of claim 1, wherein the one or more processors are individually or collectively further configured to cause the wireless device to:

receive a hybrid automatic repeat request (HARQ) acknowledgment (HARQ-ACK) for the TB.

13. The wireless device of claim 1, wherein the at least one slot comprises a half-duplex slot and the full-duplex slot, wherein a first subset of code block groups (CBGs) is mapped to the half-duplex slot, wherein a second subset of the CBGs is mapped to a first CC of the multiple CCs for the full-duplex slot, and wherein a third subset of the CBGs is mapped to a second CC of the multiple CCs for the full-duplex slot.

14. A wireless device for wireless communication, comprising:

one or more memories; and one or more processors, coupled to the one or more memories, individually or collectively configured to cause the wireless device to:

receive a transport block (TB) transmitted across multiple component carriers (CCs) of at least one slot, comprising at least one full-duplex slot, of time-frequency resources, wherein an order in which the TB is mapped across the multiple CCs of the at least one slot, including the at least one full-duplex slot, is based at least in part on a center frequency of the time-frequency resources, wherein the TB is first mapped to a first time-frequency resource, corresponding to a first CC, of the time-frequency resources prior to a second time-frequency resource, corresponding to a second CC, based at least in part on the first time-frequency resource being closer to or further from the center frequency relative to the second time-frequency resource; and process the TB based on the TB being mapped across the multiple CCs.

15. The wireless device of claim 14, wherein the at least one slot further comprises at least one half-duplex slot.

16. The wireless device of claim 14, wherein a first contiguous portion of the TB is mapped across the multiple CCs for a first time resource of multiple time resources associated with a slot of the at least one slot; and wherein a second contiguous portion of the TB is mapped across the multiple CCs for a second time resource of the multiple time resources.

17. The wireless device of claim 14, wherein a first contiguous portion of the TB is mapped to a first set of resources of a first CC of the multiple CCs; and wherein a second contiguous portion of the TB is mapped to a second set of resources of a second CC of the multiple CCs.

18. The wireless device of claim 17, wherein the order in which the multiple CCs are mapped is further based at least in part on:

a radio resource control configuration.

19. The wireless device of claim 14, wherein each CC of the multiple CCs is associated with a corresponding subset of code block groups (CBGs).

20. The wireless device of claim 19, wherein each corresponding subset of the CBGs is associated with a corresponding modulation and coding scheme.

21. The wireless device of claim 19, wherein a first CC of the multiple CCs is associated with a first contiguous subset of the CBGs, and wherein a second CC of the multiple CCs is associated with a second contiguous subset of the CBGs.

22. The wireless device of claim 21, wherein downlink control information associated with the TB indicates a first CBG of the first contiguous subset of the CBGs and a second CBG of the second contiguous subset of the CBGs.

23. The wireless device of claim 21, wherein the one or more processors are individually or collectively further configured to cause the wireless device to:

determine which of the CBGs are included in which of the multiple CCs based at least in part on available resources of the multiple CCs and a modulation and coding scheme of each of the multiple CCs.

24. The wireless device of claim 14, wherein the one or more processors are individually or collectively further configured to cause the wireless device to:

transmit separate hybrid automatic repeat request (HARQ) acknowledgments (HARQ-ACKs) for each of the multiple CCs.

25. The wireless device of claim 14, wherein the one or more processors are individually or collectively further configured to cause the wireless device to:

transmit a hybrid automatic repeat request (HARQ) acknowledgment (HARQ-ACK) for the TB.

26. The wireless device of claim 14, wherein the at least one slot comprises a half-duplex slot and the full-duplex slot, wherein a first subset of code block groups (CBGs) is mapped to the half-duplex slot, wherein a second subset of the CBGs is mapped to a first CC of the multiple CCs for the full-duplex slot, and wherein a third subset of the CBGs is mapped to a second CC of the multiple CCs for the full-duplex slot.

27. A method of wireless communication performed by a wireless device, comprising:

mapping a transport block (TB) across multiple component carriers (CCs) of at least one slot, comprising at least one full-duplex slot, of time-frequency resources, wherein an order in which the TB is mapped across the multiple CCs of the at least one slot, including the at least one full-duplex slot, is based at least in part on a center frequency of the time-frequency resources, wherein the TB is first mapped to a first time-frequency resource, corresponding to a first CC, of the time-frequency resources prior to a second time-frequency resource, corresponding to a second CC, based at least in part on the first time-frequency resource being closer to or further from the center frequency relative to the second time-frequency resource; and transmitting the TB based at least in part on mapping the TB.

28. The method of claim 27, wherein the at least one slot further comprises at least one half-duplex slot.

29. The method of claim 27, wherein the at least one slot comprises a half-duplex slot and he full-duplex slot, wherein a first subset of code block groups (CBGs) is mapped to the half-duplex slot, wherein a second subset of the CBGs is mapped to a first CC of the multiple CCs for the full-duplex slot, and wherein a third subset of the CBGs is mapped to a second CC of the multiple CCs for the full-duplex slot.

30. A method of wireless communication performed by a wireless device, comprising:

receiving a transport block (TB) transmitted across multiple component carriers CCs) of at least one slot, comprising at least one full-duplex slot, of time-frequency resources, wherein an order in which the TB is mapped across the multiple CCs of the at least one slot, including the at least one full-duplex slot, is based at least in part on a center frequency of the time-frequency resources, wherein the TB is first mapped to a first time-frequency resource, corresponding to a first CC, of the time-frequency resources prior to a second time-frequency resource, corresponding to a second CC, based at least in part on the first time-frequency resource being closer to or further from the center frequency relative to the second time-frequency resource; and processing the TB based on the TB being mapped across the multiple CCs.

\* \* \* \* \*